United States Patent
Seo et al.

(10) Patent No.: US 10,873,946 B2
(45) Date of Patent: Dec. 22, 2020

(54) METHOD FOR TRANSMITTING SIGNAL BY USING MULTI-BEAM IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Youngdae Lee, Seoul (KR); Kijun Kim, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/317,522

(22) PCT Filed: Jul. 12, 2017

(86) PCT No.: PCT/KR2017/007482
§ 371 (c)(1),
(2) Date: Jan. 11, 2019

(87) PCT Pub. No.: WO2018/012887
PCT Pub. Date: Jan. 18, 2018

(65) Prior Publication Data
US 2019/0246388 A1 Aug. 8, 2019

Related U.S. Application Data

(60) Provisional application No. 62/362,022, filed on Jul. 13, 2016.

(51) Int. Cl.
*H04W 72/04* (2009.01)
*H04L 5/00* (2006.01)

(52) U.S. Cl.
CPC ......... *H04W 72/046* (2013.01); *H04L 5/00* (2013.01); *H04L 5/005* (2013.01); *H04L 5/0055* (2013.01); *H04L 5/0082* (2013.01); *H04L 5/0023* (2013.01)

(58) Field of Classification Search
None
See application file for complete search history.

(56) References Cited

U.S. PATENT DOCUMENTS

2013/0021952 A1 1/2013 Jeong et al.
2013/0034010 A1* 2/2013 Gao ............... H04L 5/0023
370/252

(Continued)

FOREIGN PATENT DOCUMENTS

JP 2010-206574 9/2010
JP 2014-525192 9/2014

(Continued)

OTHER PUBLICATIONS

U.S. Appl. No. 62/350,453 provisional application, Jung, filed Jun. 15, 2016 (Year: 2016).*

(Continued)

*Primary Examiner* — Jay L Vogel
(74) *Attorney, Agent, or Firm* — Lee, Hong, Degerman, Kang & Waimey PC

(57) ABSTRACT

Disclosed in the present application is a method by which a terminal transmits an uplink signal to a base station in a wireless communication system. Particularly, the method comprises the steps of: receiving, from a base station, information on a reception beam pattern, which is defined in a transmission time interval (TTI) unit, of the base station; determining an uplink transmission beam pattern, which is defined in the TTI unit, by using the information on the reception beam pattern of the base station; and sequentially and repetitively transmitting the uplink signal to the base station in the TTI unit according to the uplink transmission beam pattern.

4 Claims, 9 Drawing Sheets

(56) References Cited

U.S. PATENT DOCUMENTS

| | | | |
|---|---|---|---|
| 2013/0072244 A1* | 3/2013 | Jeong | H04B 7/063 455/509 |
| 2014/0307654 A1 | 10/2014 | Kim | |
| 2016/0105872 A1 | 4/2016 | Kuo | |
| 2016/0174244 A1* | 6/2016 | Kim | H04W 72/1284 370/329 |
| 2017/0207843 A1* | 7/2017 | Jung | H04B 7/0408 |
| 2017/0367120 A1* | 12/2017 | Murray | H04W 72/046 |

FOREIGN PATENT DOCUMENTS

| | | |
|---|---|---|
| JP | 2014-529213 | 10/2014 |
| JP | 2014-530535 | 11/2014 |
| KR | 10-2013-0011993 | 1/2013 |
| KR | 10-2013-0029745 | 3/2013 |
| WO | 2015157565 | 10/2015 |
| WO | 2016086144 | 6/2016 |

OTHER PUBLICATIONS

PCT International Application No. PCT/KR2017/007482, Written Opinion of the International Searching Authority dated Oct. 17, 2017, 21 pages.

Japan Patent Office Application No. 2019-501621, Office Action dated Feb. 18, 2020, 3 pages.

* cited by examiner

FIG. 2
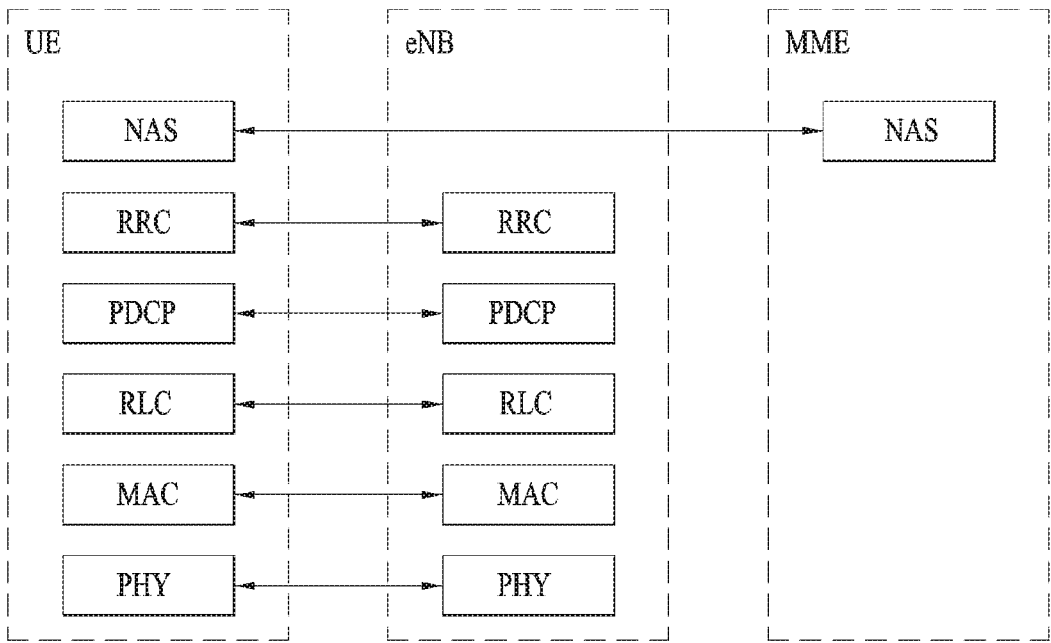
(A) CONTROL-PLANE PROTOCOL STACK
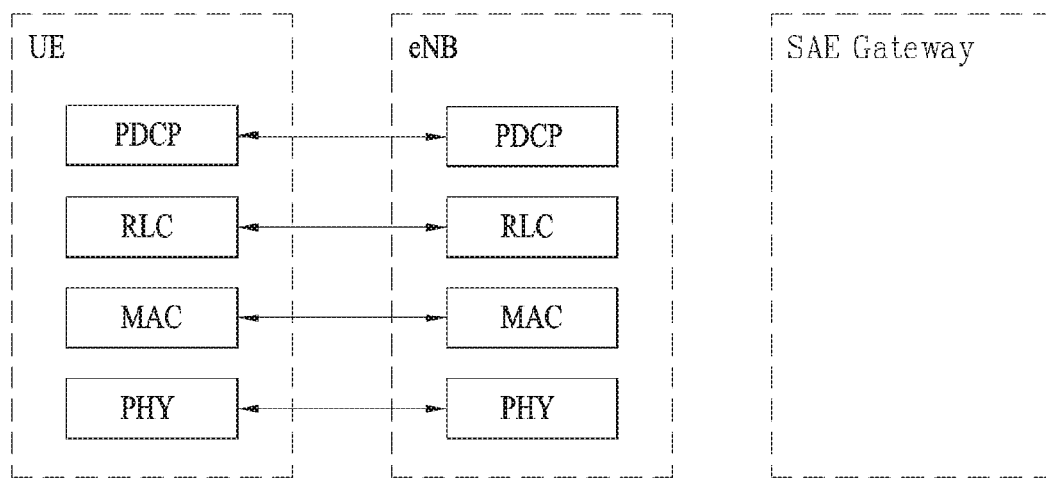
(B) USER-PLANE PROTOCOL STACK (A)  (B)

METHOD FOR TRANSMITTING SIGNAL BY USING MULTI-BEAM IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/007482, filed on Jul. 12, 2017, which claims the benefit of U.S. Provisional Application No. 62/362,022, filed on Jul. 13, 2016, the contents of which are all hereby incorporated by reference herein in their entirety.

TECHNICAL FIELD

The present invention relates to a next generation wireless communication system, and more particularly, to a method of transmitting a signal using multiple beams in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of transmitting a signal using multiple beams in a wireless communication system and apparatus therefor.

Technical Solutions

In one technical aspect of the present invention, provided herein is a method of transmitting an uplink signal to a base station by a user equipment in a wireless communication system, the method including receiving information on a received beam pattern of the base station defined in a Transmission Time Interval (TTI) unit from the base station, determining an uplink transmitted beam pattern defined in the TTI unit using the information on the received beam pattern of the base station, and transmitting the uplink signal in the TTI unit according to the uplink transmitted beam pattern to the base station sequentially and repeatedly.

In another technical aspect of the present invention, provided herein is a user equipment in a wireless communication system, the user equipment including a wireless communication module and a processor connected to the wireless communication module, the processor configured to receive information on a received beam pattern of the base station defined in a Transmission Time Interval (TTI) unit from the base station, determine an uplink transmitted beam pattern defined in the TTI unit using the information on the received beam pattern of the base station, and transmit the uplink signal in the TTI unit according to the uplink transmitted beam pattern to the base station sequentially and repeatedly.

Preferably, the user equipment may receive two or more reference signals having different transmitted beams applied thereto in two or more TTIs from the base station sequentially and check the received beam pattern of the base station using the different transmitted beams. More preferably, the UE may assume that a downlink channel and an uplink channel are identical to each other in checking the received beam pattern of the base station.

Preferably, if receiving an acknowledgement of the uplink signal from the base station during the sequential and repeated transmission, the UE may stop the sequential and repeated transmission.

Additionally, the sequentially and repeatedly transmitted uplink signal may include a same data.

Advantageous Effects

According to an embodiment of the present invention, a user equipment can transmit an uplink signal more efficiently using multiple beams in a difficult situation of channel environment measurement in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE FOR INVENTION

Figure 1:
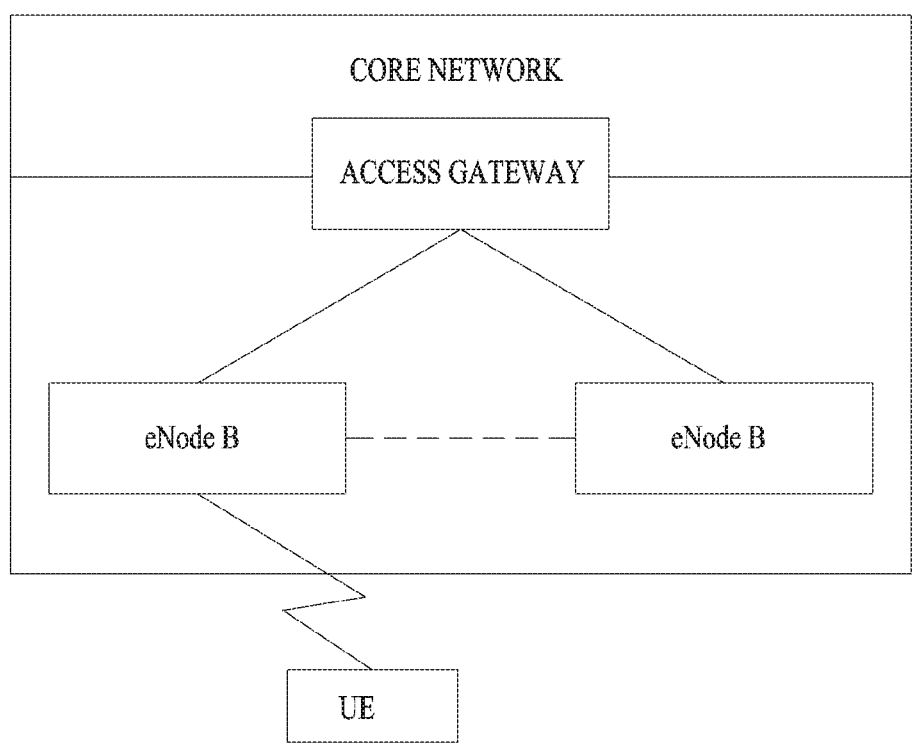
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
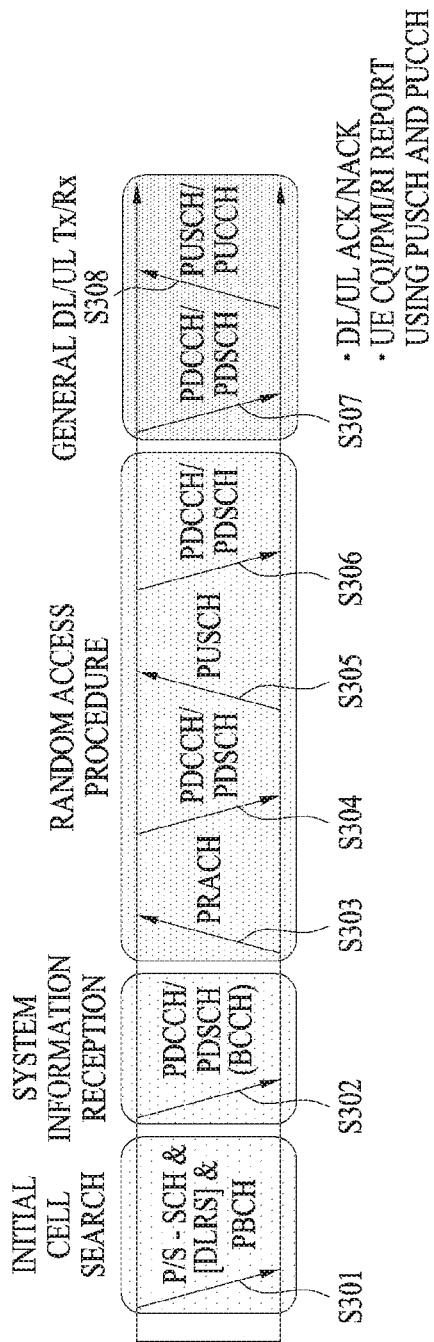
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
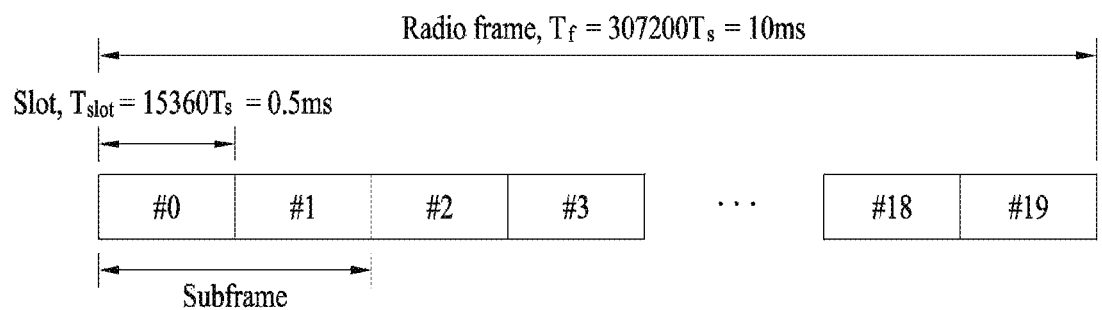
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz×2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
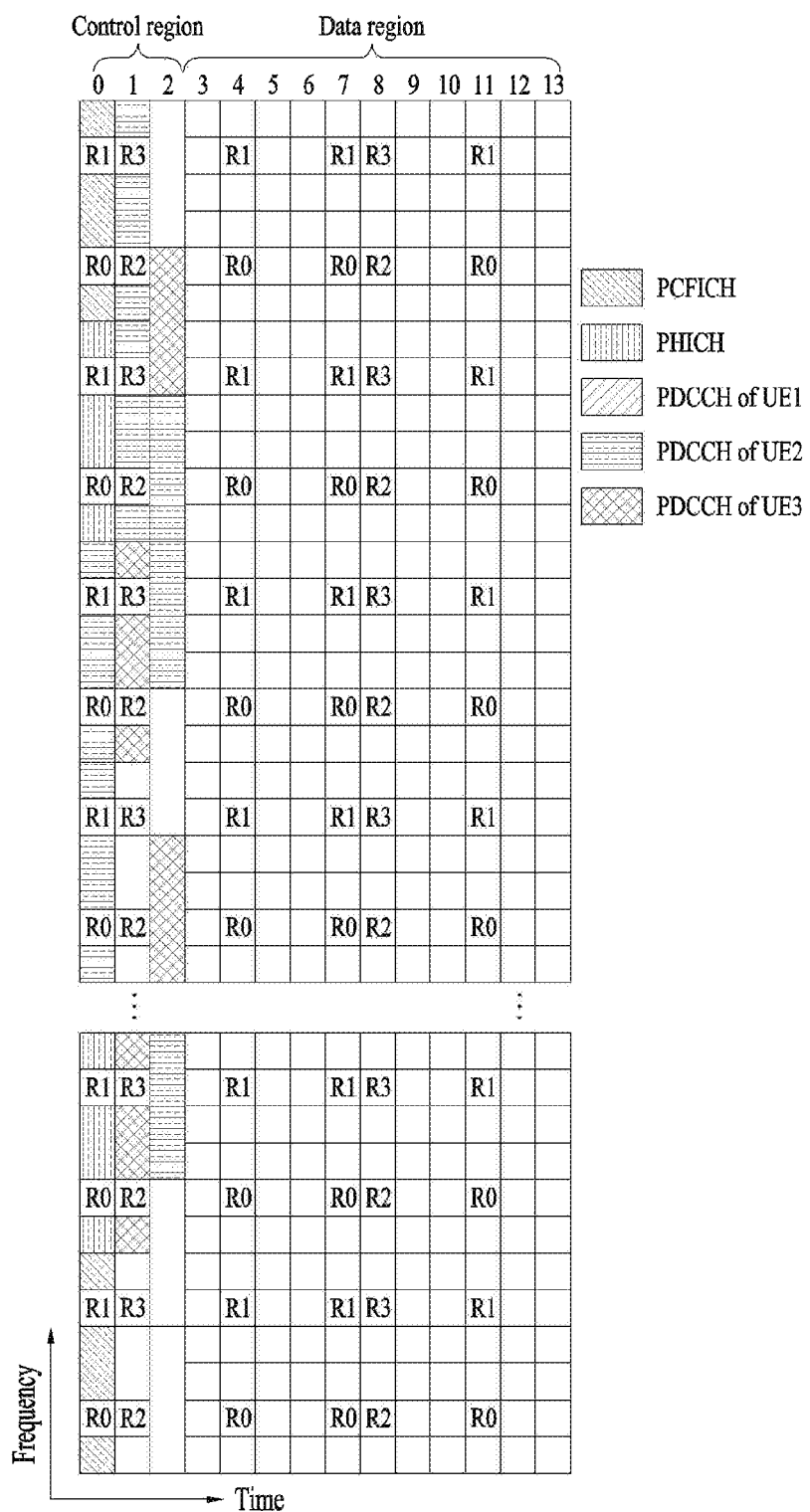
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
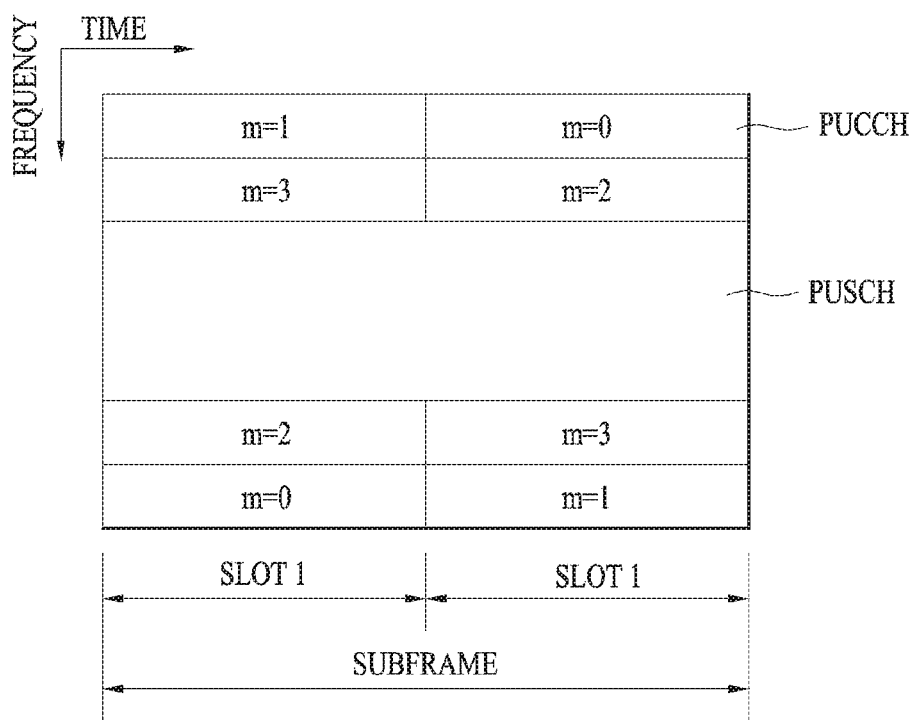
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

In some implementations, as a wavelength gets shortened in Millimeter Wave (mmW), a multitude of antenna elements can be installed in the same area. Particularly, as a wavelength on 30-GHz band is 1 cm, total 64 (=8×8) antenna elements can be installed in form of 2D (dimension) array on a 4-by-4 (cm) panel in a manner of being spaced 0.5 lambda (wavelength) apart. Hence, according to the recent tendency in the mmW field, high coverage is increased by raising a BeamForming (BF) gain using a multitude of antenna elements or the increase of throughput is attempted.

In this case, if a Transceiver Unit (TXRU) is prepared to enable transmit power and phase adjustment per antenna element, independent beamforming is possible per frequency resource. Yet, if TXRUs are installed for about 100 antenna elements all, it causes a problem that effectiveness is lowered in price aspect. Hence, considered currently is a scheme of adjusting a direction of a beam with an analog phase shifter by mapping a multitude of antenna elements to a single TXRU. As such an analog beamforming scheme can make a single beam direction only on the total band, it is disadvantageous in that a frequency selective beamforming cannot be performed.

As an intermediate form between digital BF and analog BF, it is able to consider hybrid BF having B TXRUs of which number is smaller than Q that is the number of antenna elements. In this case, although there is a difference depending on a connecting scheme between B TXRUs and Q antenna elements, the number of beam directions capable of simultaneous transmissions is limited to B or less.

Figure 7:
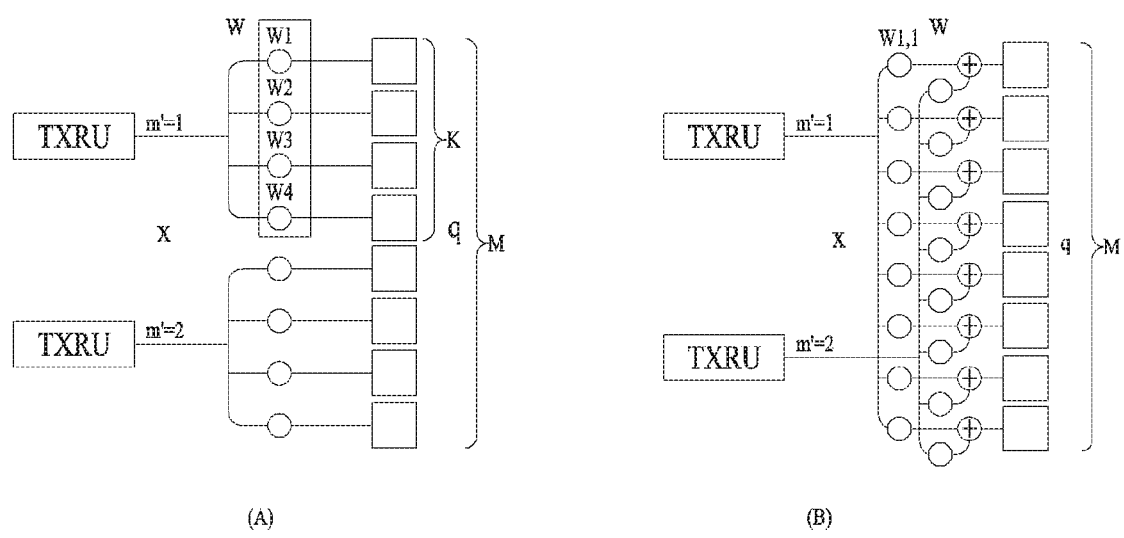
FIG. 7 shows examples of a scheme of connection between a TXRU and an antenna element.

FIG. 7 shows examples of a scheme of connection between a TXRU and an antenna element.

FIG. 7 (*a*) shows a scheme that a TXRU is connected to a subarray. In this case, an antenna element is connected to a single TXRU only. On the other hand, FIG. 7 (*b*) shows a scheme that an antenna element is connected to all TXRUs. In FIG. 7, W indicates a phase vector multiplied by a phase shifter. Namely, a direction of analog beamforming is determined by W. Here, mapping between a CSI-RS antenna port and TXRUs may include 1-to-1 or 1-to-many.

In some implementations, if a transmitting end (i.e., a base station) and a receiving end (i.e., a UE) are aware of accurate channel information, an optimal beam is selected based on the corresponding channel information and data is transmitted using the corresponding beam, which will be an optimal operation. Yet, depending on a communication environment, such an operation may be impossible or an excessive overhead may be generated to make it possible.

Particularly, in case of multicast or broadcast that a single transmitting end transmits the same data to a plurality of receiving ends, since each individual receiving end has a different optimal beam, it is impossible to select a single optimal beam. Or, although there is a single receiving end only, if a transmitting or receiving end is moving at a high speed, since an optimal beam changes at a very high speed, lots of overhead is necessary to trace it. If such a problem is caused, a transmitting end a receiving end select a plurality of beams determined as relatively good and each of the transmitting and receiving ends repeatedly transmits the same data using each beam. Such an operation may be effective. Particularly, in case of applying analog Beam-Forming (BF), since it is able to use a single beam at a single timing, such an operation may be performed in a manner of transmitting a single data across several timings, e.g., several TTIs by changing a beam used for each transmission timing.

First Embodiment

An operation for a base station to repeatedly transmit a single data in downlink using different beams is described in detail as follows.

A base station can inform a UE of a pattern of a beam, on which a same data is transmitted, through a scheduling message in advance. Having received it, the UE preferentially checks whether the corresponding data is a data necessary for the UE to receive through the scheduling message and then attempts data reception selectively at the timing of transmitting the corresponding data using a beam that seems to be optimal for the UE in a current state. Through this process, it is able to prevent a case that the UE attempts data reception at the timing of using a beam not optimal for the UE. And, it is also able to solve a problem of increasing power consumption despite a low reception success probability. Particularly, it is meaningful that a base station provides a UE with information on a precoder for future downlink transmission in addition to a beam for current downlink transmission, i.e., a precoder.

Although a UE attempts a reception at a timing of using a beam optimal for the UE, when the UE fails in the reception, if a beam used at a different specific timing of using the same data can expect a quality of a predetermined level as well, it is able to attempt reception performance improvement through small power consumption increment by attempting a reception at the corresponding timing (e.g., a timing of using a second best beam). If this is generalized, the UE can be regulated to attempt a reception of a single data several times using a predetermined count of beams. In particular, a UE can operate to attempt receptions on M beams determined as having a good reception quality among N beam on which a base station transmits the same data. Or, a UE may be regulated to attempt receptions on all beams over a predetermined quality level (e.g., a predetermined level of Reference Signal Received Power (RSRP) or Reference Signal Received Quality (RSRQ) measured from a reference signal that uses a corresponding beam).

In the above-described operation, the number of beams a UE should attempt to receive or a reference of a reception quality may be configured by a base station. Thus, it is a matter of course that the UE can receive data on a pre-determined number of beams. Moreover, if the UE succeeds in a specific data reception before attempting receptions on all of the pre-determined number of the beams, the UE may stop receptions on other beams (on which the UE does not attempt receptions yet) carrying the same data, thereby reducing power consumption.

In this operation, a single scheduling message may schedule several beam patterns carrying a single packet. Yet, in order to reduce overhead of a scheduling message and power consumed for a scheduling message reception, a single scheduling message may schedule a beam pattern for a plurality of packets. In the latter case, a transmission interval of a scheduling message increases relatively. Moreover, as a UE moves in a state of having received a scheduling message once, an optimal beam may be changed. In this case, although the UE is moving, the UE should change its operation to attempt a data reception in a transmission that uses the changed optimal beam.

In order to perform the above-described operation, a UE should be able to estimate that a base station transmission of a prescribed beam will be received with a prescribed quality at a specific timing. This can be achieved by measuring an RS transmitted on each beam by a UE, and the following method is specifically available.

—Method of Using RS (MRS) for Beam-Specific Measurement Usage

A base station transmits a Measurement-RS (MRS) periodically or aperiodically. Particularly, the base station transmits MRS differing in a location of a time/frequency resource and/or an RS sequence using a different beam. A UE receives the MRS, thereby being able to estimate which beam will be received with a prescribed quality. In this case, signaling for a beam pattern in a scheduling message may be in the form of indicating that a beamforming identical to a prescribed MRS will be used at a specific timing. In aspect that an operation of a beam change for a location movement of a UE should be measured after all, MRS has an advantage that there is no additional power consumption for measurement in determining a beam optimal for a data reception.

—Method of Using DeModulation-Reference Signal (DM-RS) Used for Data Transmission First of all, a UE measures DM-RS transmitted for demodulation of actual data on a resource designated in a scheduling message. If so, it is able to obtain a quality at a timing of using a same beam for a transmission of a base station in the future. In this case, signaling for a beam pattern in the scheduling message just indicates a set of timing points for which the same beamforming is used and may be in the form that a UE expects that a different beamforming will be applied for a different set. According to this method, since a UE should perform DM-RS measurements on all the beams transmitted by a base station in the early stage at least, it is disadvantageous in that power consumption increases. Yet, it is advantageous in that the base station can select beams more flexibly irrespective of MRS.

Meanwhile, in a specific case, a plurality of base stations transmit the same data on the same resource, thereby performing an operation of raising a reception power at a UE. This is named Single Frequency Network (SFN) transmission. In case that an operation of the present invention applies to a network that performs SFN transmission, a UE selects an optimal beam from combinations of beams selected by a base station participating in the SFN transmission, thereby attempting a reception. Particularly, in case of using a beam-specific MRS, a base station can indicate which base station will perform SFN, while using the same beamforming of a prescribed MRS at each timing, through a scheduling message. A UE measures MRS of each base station and utilizes information of the scheduling message therefor, thereby estimating a reception quality that will appear in a manner of combining each base station transmission at each timing. For example, an Rx RSRP for SFN transmission can be estimated by a sum of RSRP of each base station MRS.

As described above, an operation of transmitting the same data using a plurality of beams is effective when a network is unable to obtain an accurate location of a UE or channel information. Based on such features, an operation of the present invention can be utilized as a fallback operation in case that a specific UE has a problem caused to communication with a base station.

Particularly, in case that a UE is aware that a problem is caused to communication with a base station connected to the UE (or communication using a beam configured to be used for communication with a base station) (e.g., a case that RSRP or RSRQ becomes equal to or lower than a predetermined level, a case that a reception success rate of a control channel is estimated to become equal to or lower than a predetermined level, a case that such a case continues for a predetermined time/count, etc.), the UE does not receive a transmission of a corresponding base station/beam but may operate to attempt to receive various beams and/or a signal transmitted by the base station as well.

Moreover, although a base station has transmitted a signal to a specific UE, in case that there is no response consistently (e.g., a case that HARQ-ACK is not received despite transmitting downlink data, a case that uplink data is not received despite transmitting an uplink grant, etc.), the base station determines that a problem has been caused to communication with the corresponding UE and may attempt communication with the corresponding UE using various beams. And, the base station may further attempt a transmission from a neighbor base station as well.

To this end, whether a network attempts a transmission in a prescribed form in case of such fallback should be regulated in advance. Additionally, it is able to configure that which base station will attempt a transmission on which timing/resource using which beam. If a UE enters a fallback operation, the UE attempts a reception operation for a determined beam of a determined base station at each timing/resource according to such configuration. Of course, SFN transmissions from several base stations are available for fallback usage.

Second Embodiment

An operation for a UE to repeatedly transmit a single data using a different beam in uplink is described in detail as follows.

For an uplink transmission, a UE receives an uplink grant from a base station, and a scheduling message for an uplink transmission is included in the uplink grant. Hence, if the base station determines that it is difficult to select a single optimal beam in communication with the UE, the base station can schedule to use a plurality of beams for a single data transmission. Particularly, in a situation such as a case of applying an analog beamforming, the base station can schedule to use a different beam at a different timing.

Typically, since a reception of a data transmission performed using a different beam should be possible just with a single optimal beam, although data is transmitted on a different beam at a different timing, an HARQ operation is performed in a single HARQ process and Redundancy Version (RV) should be identically applied in a plurality of beams. Here, regarding 'performed in a single HARQ process', in case that a base station succeeds in receiving a data transmission at a specific timing, a UE may perform an operation of cancelling an operation of transmitting the same data on a different beam despite receiving an uplink grant previously.

In the scheduling for an uplink operation, a base station may directly designate an uplink Tx beam (in another sense, a precoding matrix) to be used by a UE. Yet, if the base station has difficulty in configuring such designation, the base station can operate to enable the UE to configure the designation. For example, if a UE is able to obtain information indicating that a base station is attempting a reception using an Rx beam corresponding to a beam used for a transmission beamforming of a specific MRS through a receiving process of MRS, the UE can determine what will be an optimal transmission beamforming to be used by the UE. Particularly, this may be more useful if it is able to assume that a downlink channel and an uplink channel are identical to each other like a TDD system.

Therefore, a base station informs a UE that an Rx beam to be used by the base station on attempting a reception at each timing is identical to a Tx beam of a specific MRS, and the UE can operate to attempt a transmission using a Tx beam, which becomes optimal when the base station attempts a reception using an Rx beam corresponding to the Tx beam of the corresponding MRS, (i.e., a Tx beam corresponding to the Rx beam) at the corresponding timing. Such an optimal Tx beam may be configured with a Tx beam corresponding to the Rx beam of which received power becomes maximum on receiving a corresponding MRS.

Additionally, a base station instructs a UE to repeatedly transmit the same data at several timings using the same beam, and may then operate to attempt a reception by changing an Rx beam at each timing. In this case, if an Rx beam at a first timing is not configured accurately, since it is unable to obtain a valid Rx signal, it is necessary to succeed in a reception with a reception at a second timing only. Hence, although a UE transmits the same data, it preferably operates to maintain an RV of channel coding per transmission timing instead of changing the RV. In case that a base station attempts coverage improvement through two repeated receptions in each Rx beam while attempting a reception with four types of Rx beams, a pattern transmitted by a UE may appear as Table 1.

TABLE 1

| | Timing | | | | | | | |
|---|---|---|---|---|---|---|---|---|
| | 0 | 1 | 2 | 3 | 4 | 5 | 6 | 7 |
| Rx beam | A | B | C | D | A | B | C | D |
| RV | X | X | X | X | Y | Y | Y | Y |

Referring to Table 1, a UE first transmits a first RV (e.g., RV X in Table 1) repeatedly and a base station attempts a reception by changing a beam. Thereafter, when a second RV is repeatedly transmitted again, the base station attempts a reception by changing a beam again. Through this, as two RVs transmitted on the same Rx beam are relatively spaced apart in time, it is able to obtain a better diversity gain in time domain. Of course, once the base station obtains that a signal can be received strongly using a specific beam in a receiving process of the RV X, the base station may fix an Rx beam to a corresponding specific beam in a receiving process of RV Y or fix and adjust an Rx beam into beams similar to the corresponding specific beam.

Figure 8:
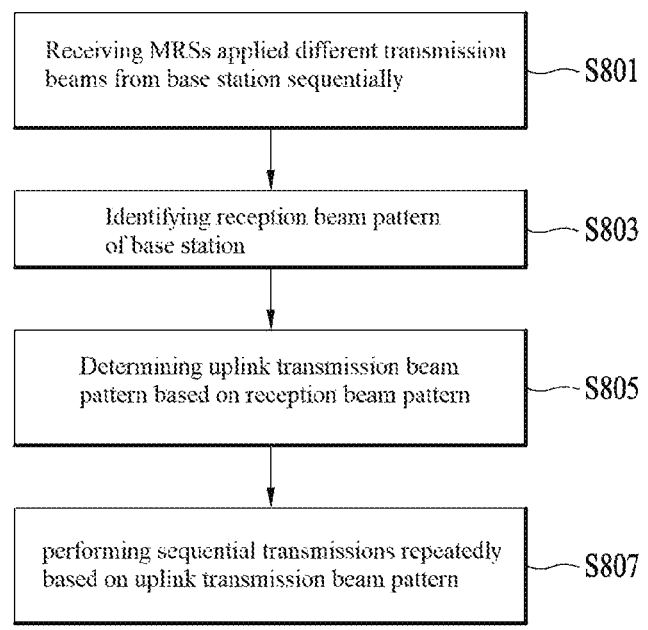
FIG. 8 is a flowchart describing an example for a user equipment to transmit an uplink signal to a base station according to an embodiment of the present invention.

FIG. 8 is a flowchart describing an example for a user equipment to transmit an uplink signal to a base station according to an embodiment of the present invention.

Referring to FIG. 8, in a step 801, a UE first receives two or more reference signals having different Tx beam applied thereto from a base station in two or more TTIs sequentially. Thereafter, in a step 803, the UE checks an Rx beam pattern of the base station suing the different Tx beams. Particularly, in this case, a downlink channel and an uplink channel are assumed as identical to each other.

Subsequently, in a step 805, the UE determines an uplink Tx beam pattern defined in the TTI unit using information on an Rx beam pattern of the base station. In a step 807, the UE repeatedly and sequentially transmits the uplink signal to the base station according to the uplink Tx beam pattern in the TTI unit. As described above, in case of receiving an acknowledgement of the uplink signal from the base station during the sequential and repeated transmission, the UE may stop the sequential and repeated transmission.

Figure 9:
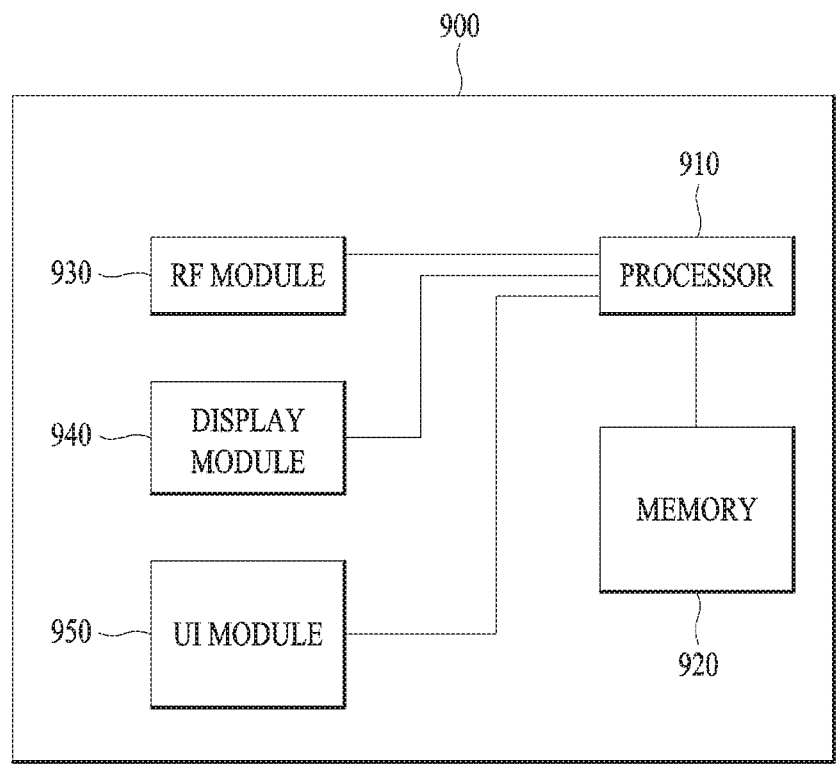
FIG. 9 is a block diagram of a communication apparatus according to an embodiment of the present invention.

FIG. 9 is a block diagram of a communication apparatus according to an embodiment of the present invention.

Referring to FIG. 9, a communication apparatus 900 includes a processor 910, a memory 920, an RF module 930, a display module 940, and a User Interface (UI) module 950.

The communication device 900 is shown as having the configuration illustrated in FIG. 9, for the convenience of description. Some modules may be added to or omitted from the communication apparatus 900. In addition, a module of the communication apparatus 900 may be divided into more modules. The processor 910 is configured to perform operations according to the embodiments of the present invention described before with reference to the drawings. Specifically, for detailed operations of the processor 910, the descriptions of FIGS. 1 to 8 may be referred to.

The memory 920 is connected to the processor 910 and stores an Operating System (OS), applications, program codes, data, etc. The RF module 930, which is connected to the processor 910, upconverts a baseband signal to an RF signal or downconverts an RF signal to a baseband signal. For this purpose, the RF module 930 performs digital-to-analog conversion, amplification, filtering, and frequency upconversion or performs these processes reversely. The display module 940 is connected to the processor 910 and displays various types of information. The display module 940 may be configured as, not limited to, a known component such as a Liquid Crystal Display (LCD), a Light Emitting Diode (LED) display, and an Organic Light Emitting Diode (OLED) display. The UI module 950 is connected to the processor 910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method of transmitting a signal using multiple beams in a wireless communication system and apparatus therefor are described by focusing on examples applying to the 3GPP LTE system, they are applicable to various wireless communication systems as well as to the 3GPP LTE system.

What is claimed is:

1. A method of transmitting uplink signals to a base station by a user equipment in a wireless communication system, the method comprising:
   receiving information on an uplink reception beam pattern of the base station defined in a Transmission Time Interval (TTI) unit from the base station;
   determining an uplink transmission beam pattern defined in the TTI unit using the information on the uplink reception beam pattern of the base station; and
   transmitting repeatedly to the base station the uplink signals having same data and same redundancy version (RV) in the TTI unit on each of a plurality of different uplink beams of the uplink transmission beam pattern,
   wherein receiving the information on the uplink reception beam pattern of the base station comprises:
   receiving two or more reference signals having different downlink transmission beams applied thereto in two or more TTIs from the base station sequentially; and
   determining the uplink reception beam pattern of the base station using the different downlink transmission beams, based on that a downlink channel and an uplink channel are identical to each other,
   wherein the base station informs the user equipment that a reception beam to be used by the base station on attempting a reception at each of the repeated transmissions is identical to a transmission beam of a specific reference signal, and
   wherein the repeatedly transmitted uplink signals have an identical redundancy version for a single Hybrid Automatic Repeat and request (HARQ) process.

2. The method of claim 1, wherein the transmitting the uplink signals comprises if receiving an acknowledgement related to one of the uplink signals from the base station during the repeated transmission, stopping the repeated transmission.

3. A user equipment in a wireless communication system, the user equipment comprising:
   a wireless communication module; and
   a processor connected to the wireless communication module, the processor configured to receive information on an uplink reception beam pattern of the base station defined in a Transmission Time Interval (TTI) unit from the base station, determine an uplink transmission beam pattern defined in the TTI unit using the information on the uplink reception beam pattern of the base station, and transmit repeatedly to the base station uplink signals having same data and same redundancy version (RV) in the TTI unit on each of a plurality of different uplink beams of the uplink transmission beam pattern,
   wherein the processor is configured to receive two or more reference signals having different downlink transmission beams applied thereto in two or more TTIs from the base station sequentially and to determine the uplink reception beam pattern of the base station using the different downlink transmission beams, based on that a downlink channel and an uplink channel are identical to each other,
   wherein the base station informs the user equipment that a reception beam to be used by the base station on attempting a reception at each of the repeated transmissions is identical to a transmission beam of a specific reference signal, and
   wherein the repeatedly transmitted uplink signals have an identical redundancy version for a single Hybrid Automatic Repeat and request (HARQ) process.

4. The user equipment of claim 3, wherein if receiving an acknowledgement related to one of the uplink signals from the base station during the repeated transmission, the processor stops the repeated transmission.

* * * * *